Figure 6:
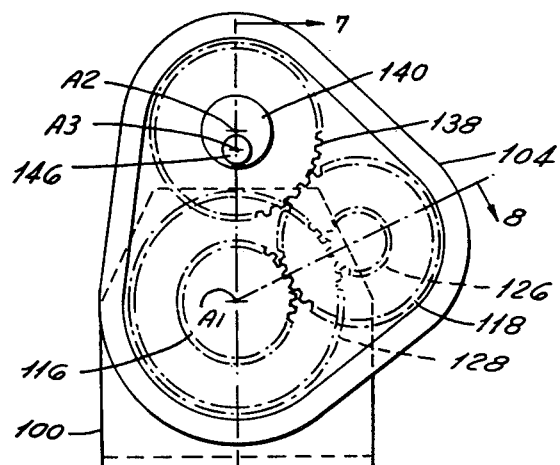

United States Patent [19]

Brems

[11] 4,137,797
[45] Feb. 6, 1979

[54] PRIME MOVER MECHANISM
[76] Inventor: John H. Brems, 32867 White Oaks Trail, Birmingham, Mich. 48010
[21] Appl. No.: 838,903
[22] Filed: Oct. 3, 1977

Related U.S. Application Data
[62] Division of Ser. No. 643,559, Dec. 22, 1975.
[51] Int. Cl.² ............................................. F16H 1/28
[52] U.S. Cl. ......................................... 74/801; 74/52
[58] Field of Search .................... 74/52, 660, 801, 800

[56] References Cited
U.S. PATENT DOCUMENTS
2,676,799  4/1954  Fletcher .............................. 74/52 X Primary Examiner—Benjamin W. Wyche
Assistant Examiner—Frank H. McKenzie, Jr.
Attorney, Agent, or Firm—Barnes, Kisselle, Raisch & Choate

[57] ABSTRACT

A mechanism for generating a square output motion utilizing a continuous constant speed rotary input. A reaction member such as an internal or external ring gear concentric to a first axis is provided together with first and second rotating members, the second being mounted for rotation on the first rotating member on an axis spaced from the first axis. An output member is mounted on the second rotating member and a means is provided for connecting for rotation the second rotating member and the reaction member. Input rotation of the second rotating member causes the output member to follow a square path.

3 Claims, 8 Drawing Figures

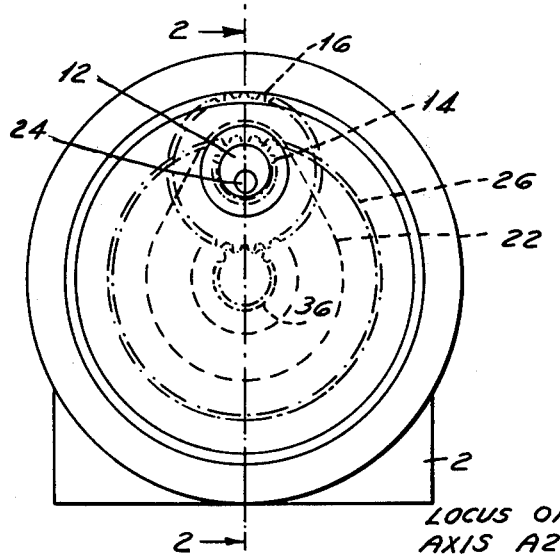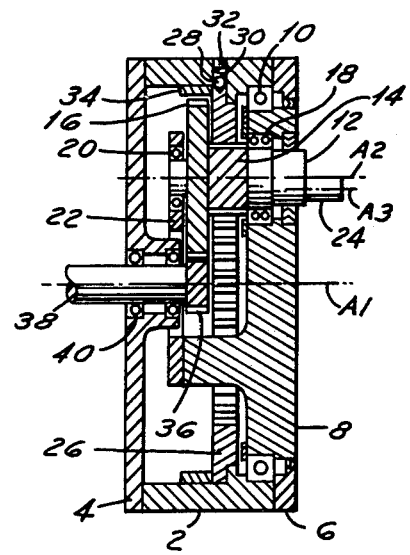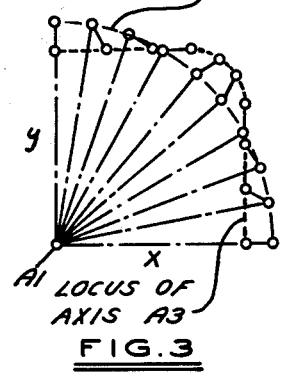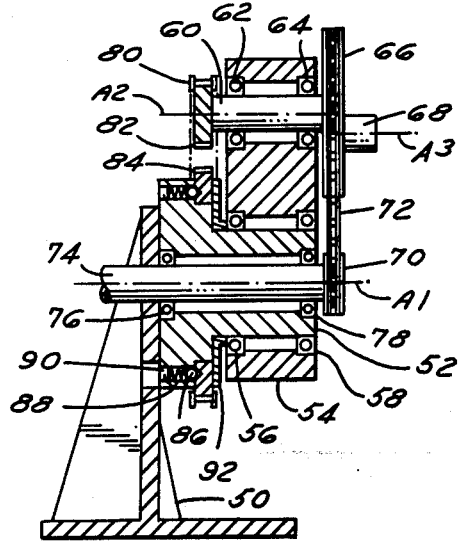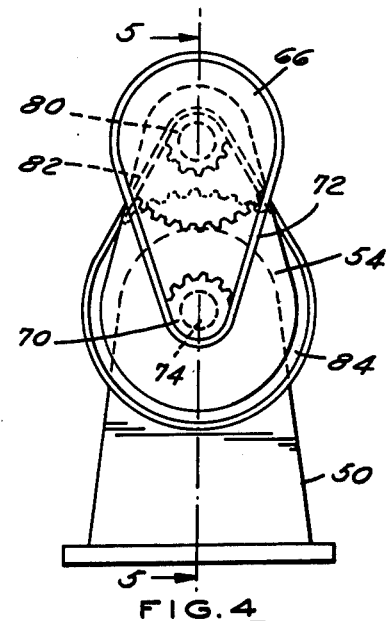

PRIME MOVER MECHANISM

This application is a division of my copending application, Ser. No. 643,559, filed Dec. 22, 1975, entitled "Prime Mover Mechanism," which was a continuation of my application, Ser. No. 526,480, filed Nov. 25, 1974, entitled "Prime Mover Mechanism," now abandoned, which abandoned application was a division of my application entitled "Prime Mover Mechanism and Transfer System," Ser. No. 266,335, filed June 26, 1972, now U.S. Pat. No. 3,857,479, dated Dec. 31, 1974.

This invention relates to a Prime Mover Mechanism in which an output member is caused to move in a substantially square pattern.

It is an object of this invention to provide a basic prime mover mechanism which sequentially generates four distinct acceleration-deceleration cycles in an essentially square pattern.

It is a further object of this mechanism to utilize a portion of the square generating system as part of an internal reduction system, thereby significantly decreasing the input torque requirements.

It is a further object of this invention to provide a mechanism capable of generating a square output motion with internal torque reduction using only chains and sprockets of their equivalent.

Other objects and features of the invention will be apparent in the following description, claims, and accompanying drawings in which the principles of operation and use are set forth in connection with the best mode presently contemplated for the practice of the invention.

DRAWINGS accompany the disclosure and the various views thereof may be briefly described as:

FIG. 1, an outside elevation of the drive mechanism.

FIG. 2, a sectional view on line 2—2 of FIG. 1.

FIG. 3, a diagrammatic view of one quadrant output of the drive mechanism.

FIG. 4, an elevation of a modified embodiment of the invention using a chain or belt drive.

FIG. 5, a sectional view of the embodiment shown in FIG. 4 taken on line 5—5.

FIG. 6, an elevation of a second modification of the drive mechanism.

Figure 7:
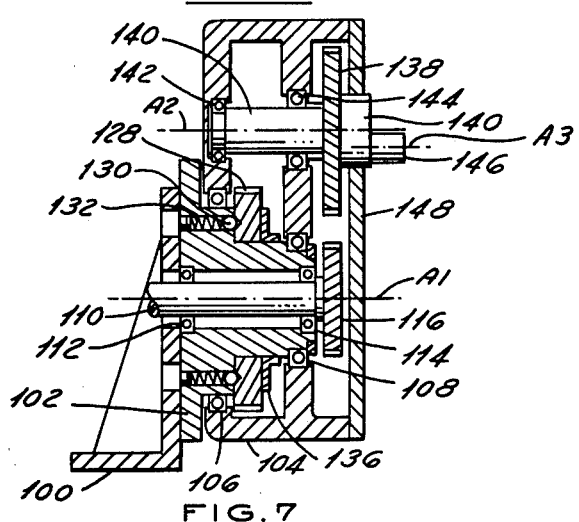

FIG. 7, a sectional view on line 7—7 of FIG. 6.

Figure 8:
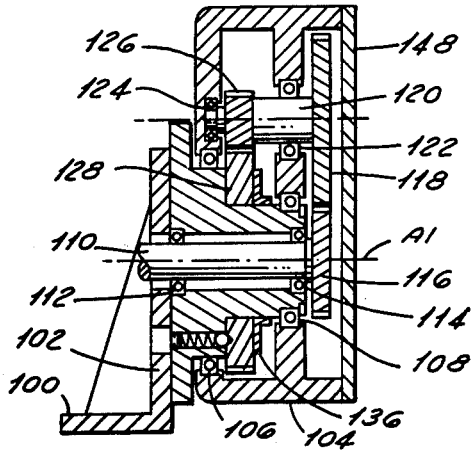

FIG. 8, a sectional view on line 8—8 of FIG. 6.

Referring to FIGS. 1 and 2, the case assembly is made up of a case 2, an input cover 4 and an output cover 6. A planetary carrier 8 is mounted in the case 2 through a double contact bearing 10. A planetary cluster is made up of a planetary shaft 12, a planetary gear 14, and a cluster gear 16 which rotate as a unit about axis A2; the planetary shaft 14 is mounted through bearing 18 in the planetary carrier 8 and through bearing 20 in the planetary carrier extension plate 22 which is rigidly bolted to the planetary carrier 8. An output shaft 24 is mounted to the planetary shaft 12 with a predetermined eccentricity, i.e., the centerline A3 of the output shaft 24 is displaced from the centerline A2 of the planetary shaft 12.

The planetary gear 14 is suitably formed to mesh with an internal gear 26 mounted in the case 2. This gear 26 is concentric with the axis A1 of the planetary carrier 8; this gear 26 is normally prevented from rotating within the case 2 through the action of the detent assembly consisting of ball 28, spring 30, and retainer 32. The ball 28 seats in a conical pocket in the gear 26, retaining the gear from rotating until a certain predetermined load is reached; if this load is exceeded, the gear 26 is free to rotate. The gear 26 is axially positioned in the case by retainer ring 34.

An input gear 36 is mounted on an input shaft 38 mounted in bearings 40 in the input cover 4. This input gear 36 is suitably formed to mesh with the cluster gear 16.

When the input shaft 38 is rotated by some external drive means, it causes the cluster gear 16 to rotate about the (moving) axis A2, thereby causing the planetary gear 14 to rotate. This causes the planetary carrier 8 to rotate about the axis A1. For the functions intended, the pitch diameter of the planetary gear 14 will be made substantially ¼ of the pitch diameter of the internal gear 26. Therefore, for each revolution of the planetary carrier 8 about axis A1, the shaft 12 will make four revolutions about the moving axis A2.

The output shaft 24 is concentric about an axis A3 which is displaced from the axis A2 by some distance which is defined as the eccentricity. More particularly, to eliminate the effects of scale, the eccentricity will be defined as the ratio of the distance from A2 to A3 to the distance from axis A1 to A2. When this value is chosen in the approximate range of 1/9 to 2/9, a very useful output may be derived from the translational output characteristics of the output shaft 24.

An example of the translational behavior of the shaft 24 during one rotation of the planetary gear 14 with respect to the internal gear 26 may be visualized by reference to the quadrant view of FIG. 3, a series of superimposed schematic sketches of the mechanism taken at 10° intervals of rotation of the planetary carrier 8. A total of 90° of planetary carrier 8 rotation are shown, representing 360° of planetary gear 14 rotation with respect to the planetary carrier. It will be understood that the behavior of the system in each of the other three quadrants will be symmetrical with that of the single quadrant shown in FIG. 3. The eccentricity between axis A3 and A2 utilized in the mechanism in FIG. 3 is ⅛ of the distance from the axis A1 to the axis A2. For reference purposes, two axes of motion, X and Y are shown.

During a complete rotation of the planetary carrier 8, the path followed by the axis A3 will be a near square with four equal substantially straight sides and four rounded corners. Equally important, if the planetary gear 14 rotates at a constant angular velocity, the movement characteristics of the axis A3 along its path is such that it starts each side with a near zero velocity component along the axis parallel to that side, smoothly accelerates to a maximum velocity during its traverse of that side, reaches a peak velocity at the center of that side, smoothly decelerates as it approaches the next corner, and finally achieves a near zero velocity component along the axis parallel to that side as it reaches the end of the corner.

Essentially then, the movement pattern of the axis A3 may be considered as four sequential legs, each of which is substantially straight, and along which the axis A3 accelerates and decelerates reaching a peak velocity along that leg at the center of that leg starting at a near zero velocity at the beginning of that leg and reaching a near zero velocity at the end of that leg.

A second embodiment of the mechanism is shown in FIGS. 4 and 5. Referring to these figures, a frame 50 supports a base ring 52. A rotating arm 54 is mounted on the base ring 52 through bearings 56 and 58 through which it rotates on a fixed axis A1. A planetary shaft 60 is mounted in the outboard end of the arm 54 through bearings 62 and 64 and rotates on a moving axis A2.

A sprocket 66 is rigidly attached to shaft 60, and an output shaft 68 is rigidly attached to the assembly made of shaft 60 and sprocket 66. This output shaft rotates on an axis A3 which is displaced from and is therefore eccentric to axis A2.

An input sprocket 70 rotating on the axis A1 drives the sprocket 66 through a chain 72. The sprocket 70 is in turn mounted on and driven by an input shaft 74 mounted in the base ring 52 through bearings 76 and 78.

A planetary sprocket 80 is rigidly attached to shaft 60. A chain 82 connects the sprocket 80 to a stationary sprocket 84 which is mounted on the base ring 52. Two ball detent assemblies, consisting of balls 86, springs 88, and retainers 90 mounted in the base ring 52 engage conical seats in the sprocket 84 and prevent it from rotating on the base ring 52 until a preset overload torque is reached. A retainer ring 92 keeps the sprocket 84 properly seated on the base ring 52. The tooth ratio between the sprocket 80 and the sprocket 84 is 1 to 4, i.e., the sprocket 84 has four times as many teeth as the sprocket 80, and the pitch diameter of the sprocket 84 is approximately four times as large as the pitch diameter of the sprocket 80. Therefore, for each revolution of the arm 54 about the axis A1, the shaft 60 rotates four complete revolutions about the axis A2.

When the input shaft 74 is rotated by some external drive means, it causes the sprocket 70 to drive the sprocket 66 through the chain 72. This in turn causes the shaft 60 to rotate about its axis A2, and the sprocket 80 in mesh with chain 82 causes the arm 54 to rotate about axis A1. Since the sprocket 84 has four times as many teeth as sprocket 80, the arm 54 will rotate once around axis A1 for every four revolutions of the shaft 80 with respect to arm 54.

It can be seen, therefore, that the mechanism of FIGS. 4 and 5 is the kinematic equivalent of the mechanism of FIGS. 1 and 2, and that the path of the output shaft 68 and its axis A3 will be identical with that described by the output shaft 24, if the generating distances of axis A1 to axis A2 and the eccentricities are identical.

A third embodiment of this same mechanism is shown in FIGS. 6, 7 and 8. The key characteristics of the mechanisms previously described is that an output shaft on an axis A3 rotates about a second moving axis A2 at a relative angular rate four times greater and in the opposite direction than that axis A2 rotates about a fixed axis A1.

This same effect is accomplished in a different way in the following embodiment. Referring to FIGS. 6, 7 and 8, a frame 100 supports a base ring 102 which in turn rotatably supports a case 104 through bearings 106 and 108.

An input shaft 110 is supported in the base ring 102 through bearings 112 and 114. Both the input shaft 110 and the case 104 rotate about the fixed axis A1. An input gear 116 is mounted on the input shaft 110, and meshes with an intermediate gear 118 mounted on an intermediate shaft 120 which is mounted in the case 104 through bearings 122 and 124. A drive gear 126 is mounted on shaft 120, and is suitably formed to mesh with a stationary gear 128 mounted on the base ring 102. The gear 128 is maintained in a stationary position, until some predetermined overload torque is reached, by two ball detent assemblies consisting of balls 130, springs 132, and retainers 134, mounted in the base ring 102. A spacer ring 136 is fastened to the base ring 102 and maintains the axial position of the gear 128.

The intermediate gear 118 also meshes with gear 138 mounted on shaft 140 rotating on axis A2 in bearings 142 and 144 mounted in the case 104. The output shaft 146 is mounted to the shaft 140 and rotates about an axis A3 which is eccentric to the axis A2. A cover 148 is bolted to the case 104 and is used to seal the entire gear train.

It can be seen that when the input shaft 110 is rotated, the gear 116 causes the gear 118 to rotate. This in turn causes the gear 126 to rotate, driving the case 104, and all components mounted therein in a rotary motion about axis A1, since the gear 126 is in mesh with the stationary gear 128. The only restriction is that the pitch diameter of the gear 116 be different than the pitch diameter of the gear 128.

The gear 118 also drives the gear 138 causing the shaft 140 to rotate about the moving axis A2 in the opposite direction as the direction in which the entire case 104 rotates about axis A1. If we now define the pitch diameters of the gears as follows:

P.D. Gear 126 = $P_1$
P.D. Gear 128 = $P_2$
P.D. Gear 118 = $P_3$
P.D. Gear 138 = $P_4$ It can be seen that if the following equation is satisfied $$(P_2/P_1) \times (P_3/P_4) = 4$$

then the shaft 140 will rotate four times about axis A2 relative to the case 104 during a single rotation of the case 104 about axis A1 relative to the base ring 102, and as previously shown, the rotations are in the opposite directions.

Therefore, for equal parameters which are the distance from axis A1 to axis A2 and the distance from axis A2 to axis A3, the kinematic behavior of the axis A3 of the shaft 146 will be identical with the behavior of the axis A3 in the two previously described mechanisms.

In all three embodiments, it will be noted that the reaction member, as exemplified by gear 26, or sprocket 84 or gear 128, is restrained from rotating with respect to the base by a ball detent type clutch system. The purpose of this system is to provide an overload release point which will slip in the event the output shaft encounters an excessive load along any of the four legs of its movement.

Kinematic analysis reveals an extremely large variation in the mechanical advantage between input torque and output thrust over various portions of the cycle. Hence an overload system anywhere in the input train would not be consistently effective. However, the relationship between output thrust and torque on the reaction member is remarkably consistent for all portions of the cycle. Therefore, the overload release system must be applied to the reaction member to be properly and consistently effective.

I claim:
1. A mechanism to generate a substantially square output motion comprising:
   (a) a frame member,
   (b) a reaction member mounted on said frame member concentric about a first axis, and adapted for peripheral driving engagement with flexible drive means,

(c) a first rotating member mounted on said frame for rotation about said first axis, (d) a second rotating member mounted for rotation on said first rotating member and rotating about a second axis displaced from said first axis, (e) an output member mounted on said second rotating member concentric about a third axis displaced from said second axis, (f) a first drive member mounted on said second rotating member and adapted for peripheral driving engagement with flexible drive means and having a pitch diameter one fourth as large as the pitch diameter of said reaction member, (g) a continuous loop of flexible drive means in peripheral driving engagement with said reaction member and said first drive member, and (h) driving means to impart rotation to one of said rotating members.

2. A mechanism to generate a substantially square output motion comprising:

(a) a frame member, (b) a reaction sprocket member mounted on said frame member concentric about a first axis, (c) a first rotating member mounted on said frame for rotation about said first axis, (d) a second rotating member mounted for rotation on said first rotating member and rotating about a second axis displaced from said first axis, (e) an output member mounted on said second rotating member concentric about a third axis displaced from said second axis, (f) a first sprocket member mounted on said second rotating member and having a pitch diameter one-fourth as large as the pitch diameter of said reaction sprocket member, (g) continuous flexible drive means in tangential driving engagement with said reaction sprocket member and said first sprocket member, and (h) driving means to impart rotation to one of said rotating members.

3. A mechanism to serve as a gear reducer while generating a substantially square output motion comprising:

(a) a frame member, (b) a reaction member mounted on said frame member concentric about a first axis, (c) a first rotating member mounted on said frame for rotation about said first axis, and rotating in a first direction at a first angular velocity for any given input speed, (d) a second rotating member mounted for rotation on said first rotating member and rotating about a second axis displaced from said first axis, (e) an output member mounted on said second rotating member concentric about a third axis displaced from said second axis, (f) first means connecting for rotation said second rotating member and said reaction member whereby said second rotating member rotates in a second direction opposite said first direction and at an angular velocity four times as great as said first angular velocity, (g) an input member mounted for rotation about said first axis, (h) second means connecting for rotation said input member and said second rotating member for a direct transmission of torque from said input member to said second rotating member, (i) said reaction member being a first sprocket centered on said first axis, and said first connecting means comprising a second sprocket having a pitch diameter one-fourth of said first sprocket, and mounted on said second rotating member, and (j) a continuous drive means engaging said respective sprockets.

* * * * *